(12) United States Patent
Billings

(10) Patent No.: US 10,355,401 B1
(45) Date of Patent: Jul. 16, 2019

(54) TRAILER WIRING ENCLOSURE

(71) Applicant: Brian Billings, York, PA (US)

(72) Inventor: Brian Billings, York, PA (US)

(*) Notice: Subject to any disclaimer, the term of this patent is extended or adjusted under 35 U.S.C. 154(b) by 0 days.

(21) Appl. No.: 16/056,614

(22) Filed: Aug. 7, 2018

(51) Int. Cl.
*H01R 13/60* (2006.01)
*B60D 1/62* (2006.01)
*B60D 1/60* (2006.01)
B62D 63/08 (2006.01)
H01R 24/28 (2011.01)

(52) U.S. Cl.
CPC .......... *H01R 13/60* (2013.01); *B60D 1/605* (2013.01); *B60D 1/62* (2013.01); B62D 63/08 (2013.01); H01R 24/28 (2013.01); H01R 2201/26 (2013.01)

(58) Field of Classification Search
CPC .......... H01R 13/60; B60D 1/605; B60D 1/62
USPC .......................................................... 439/35
See application file for complete search history.

(56) References Cited

U.S. PATENT DOCUMENTS

| 4,738,641 | A | | 4/1988 | Eversole, Jr. | |
|---|---|---|---|---|---|
| 5,288,094 | A | * | 2/1994 | Putnam | B60D 1/62 248/214 |
| 5,380,209 | A | | 1/1995 | Converse | |
| 5,722,854 | A | * | 3/1998 | Geisler | B60D 1/62 439/148 |
| 5,904,261 | A | * | 5/1999 | Belinky | B60D 1/62 220/3.9 |
| 6,076,691 | A | * | 6/2000 | Belinky | B60D 1/62 220/3.9 |
| 6,083,016 | A | * | 7/2000 | Waynick, Sr. | H01R 13/60 439/135 |
| 6,638,083 | B2 | * | 10/2003 | Rhude | H01R 13/60 439/142 |
| D496,888 | S | | 10/2004 | Johnson, Jr. | |
| 6,945,551 | B2 | * | 9/2005 | Blake | B60D 1/065 280/507 |
| 6,971,663 | B1 | * | 12/2005 | Blake | B60D 1/60 280/155 |
| 6,971,883 | B1 | * | 12/2005 | Ridge | H01R 13/516 439/142 |
| 9,016,707 | B2 | * | 4/2015 | Bowe | B60D 1/64 280/420 |
| 2008/0113522 | A1 | * | 5/2008 | Wagner | H01R 13/5213 439/35 |
| 2010/0144197 | A1 | * | 6/2010 | Rotenberg | H01R 13/516 439/573 |

* cited by examiner

*Primary Examiner* — Alexander Gilman

(57) ABSTRACT

The trailer wiring enclosure is adapted for use with a tongue. The tongue is configured for use in attaching a trailer to a tractor. The tongue further comprises a shaft, a hitch, and a pigtail. The pigtail forms an electrical connection with the electrical system of the tractor. The pigtail further comprises a cable and a plug. The trailer wiring enclosure is a container. The trailer wiring enclosure is a container that stores the pigtail such that the pigtail is protected from the weather. The trailer wiring enclosure comprises a primary tube, a capped tube, and a fastening structure. The primary tube is the container that stores the pigtail. The capped tube is a lid that encloses the primary tube. The fastening structure attaches the primary tube to the shaft.

12 Claims, 2 Drawing Sheets

TRAILER WIRING ENCLOSURE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including interconnecting vehicles, more specifically, a protective cover for an electrical circuit. (B60D1/605 and B60D1/62)

SUMMARY OF INVENTION

The trailer wiring enclosure is adapted for use with a tongue. The tongue is configured for use in attaching a trailer to a tractor. The tongue further comprises a shaft, a hitch, and a pigtail. The pigtail forms an electrical connection with the electrical system of the tractor. The pigtail further comprises a cable and a plug. The trailer wiring enclosure is a container. The trailer wiring enclosure is a container that stores the pigtail such that the pigtail is protected from the weather. The trailer wiring enclosure comprises a primary tube, a capped tube, and a fastening structure. The primary tube is the container that stores the pigtail. The capped tube is a lid that encloses the primary tube. The fastening structure attaches the primary tube to the shaft.

These together with additional objects, features and advantages of the trailer wiring enclosure will be readily apparent to those of ordinary skill in the art upon reading the following detailed description of the presently preferred, but nonetheless illustrative, embodiments when taken in conjunction with the accompanying drawings.

In this respect, before explaining the current embodiments of the trailer wiring enclosure in detail, it is to be understood that the trailer wiring enclosure is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the trailer wiring enclosure.

It is therefore important that the claims be regarded as including such equivalent construction insofar as they do not depart from the spirit and scope of the trailer wiring enclosure. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
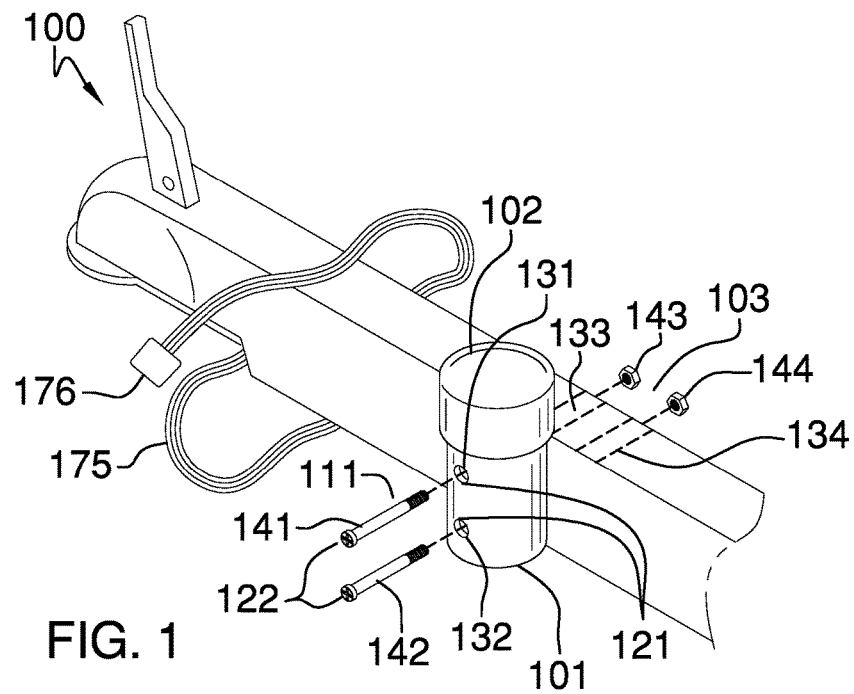
FIG. 1 is an exploded view of an embodiment of the disclosure.
Figure 2:
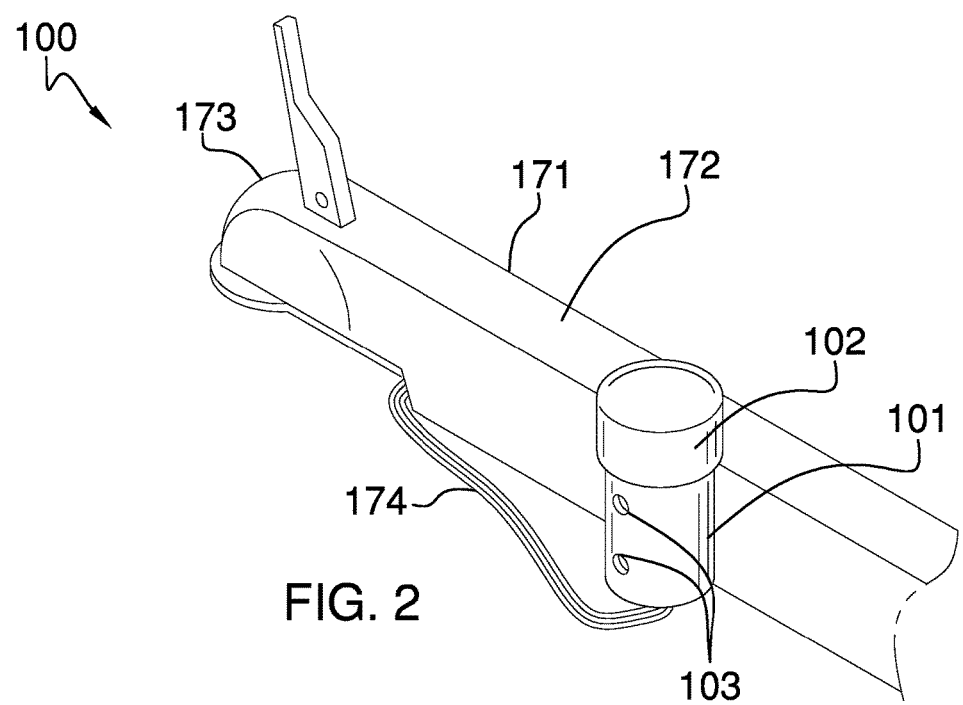
FIG. 2 is a perspective view of an embodiment of the disclosure.
Figure 3:
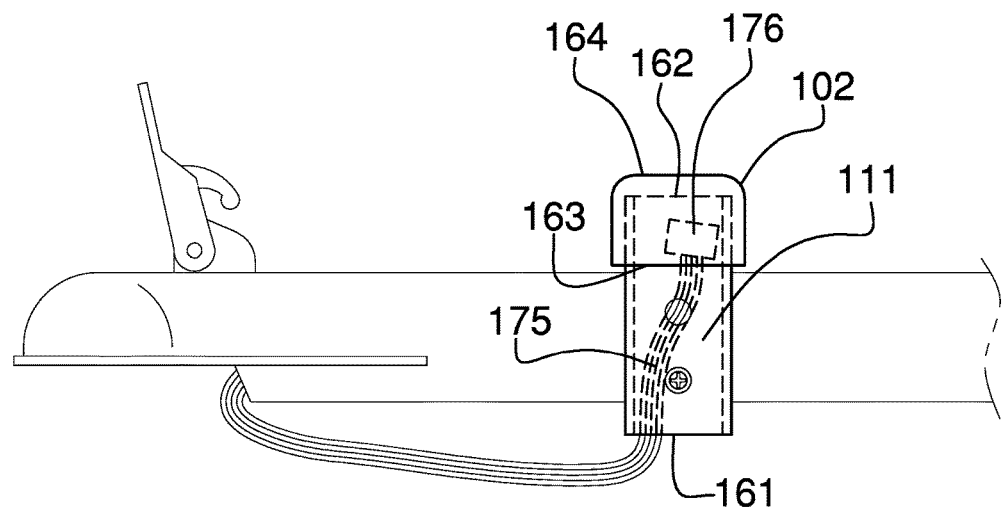
FIG. 3 is a side view of an embodiment of the disclosure.
Figure 4:
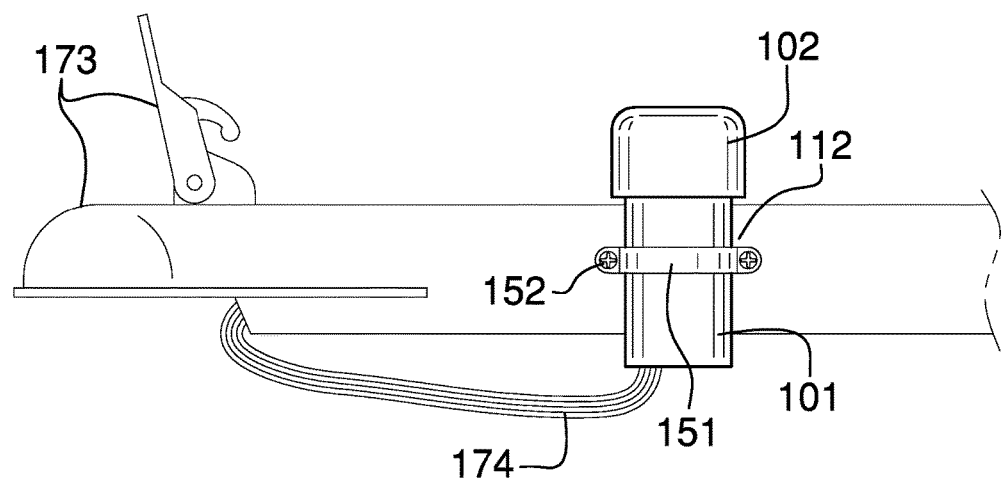
FIG. 4 is a side view of an alternative embodiment of the disclosure.

Detailed reference will now be made to one or more potential embodiments of the disclosure, which are illustrated in FIGS. 1 through 4.

The trailer wiring enclosure 100 (hereinafter invention) is adapted for use with a tongue 171. The tongue 171 is configured for use in attaching a trailer to a tractor. The tongue 171 further comprises a shaft 172, a hitch 173, and a pigtail 174. The pigtail 174 forms an electrical connection with the electrical system of the tractor. The pigtail 174 further comprises a cable 175 and a plug 176. The invention 100 is a container. The invention 100 is a container that stores the pigtail 174 such that the pigtail 174 is protected from the weather. The invention 100 comprises a primary tube 101, a capped tube 102 and a fastening device 103. The primary tube 101 is the container that stores the pigtail. The capped tube 102 is a lid that encloses the primary tube 101. The fastening device 103 attaches the primary tube 101 to the shaft 172.

The tongue 171 is defined elsewhere in this disclosure. The shaft 172 is a prism-shaped extension structure that separates the hitch 173 from the trailer. The hitch 173 is defined elsewhere in this disclosure. The pigtail 174 is defined elsewhere in this disclosure. The cable 175 is defined elsewhere in this disclosure. The plug 176 is defined elsewhere in this disclosure.

The primary tube 101 is a prism-shaped tubular structure. The primary tube 101 forms the primary storage space of the invention 100. The primary tube 101 is further defined with an inferior end 161 and a superior end 162. The primary tube 101 stores the plug 176 end of the pigtail 174 when the tongue 171 is not in use. The primary tube 101 attaches to the shaft 172 of the tongue 171. The pigtail 174 inserts into the inferior end 161 of the primary tube 101. The inferior end 161 is a first end of the primary tube 101. The inferior end 161 is the end of the primary tube 101 that is proximal to the road the trailer is on. The superior end 162 is a first end of the primary tube 101 superior end 162 is the end of the primary tube 101 that is distal from the inferior end 161.

The capped tube 102 is a prism-shaped structure. The capped tube 102 is formed as a capped tube 102. The inner diameter of the capped tube 102 is greater than the outer diameter of the primary tube 101 such that the capped tube 102 fits over the primary tube 101. The open end 163 of the capped tube 102 mounts over the superior end 162 of the primary tube such that the pigtail 174 is protected from the weather while the pigtail 174 is contained in the primary tube 101. The capped tube 102 is further defined with an open end 163 and a closed end 164.

The fastening device 103 is a mechanical apparatus that attaches the primary tube 101 to the shaft 172 of the tongue 171. The fastening device 103 attaches the primary tube 101 to the shaft 172 such that the center axis of the primary tube 101 is perpendicular to the center axis of the shaft 172. The fastening device 103 is selected from the group consisting of a preferred fastening structure 111 and a secondary fastening structure 112. The applicant prefers the use of the preferred fastening structure 111 to attach the primary tube 101 to the shaft 172.

The preferred fastening structure 111 provides a structure through which the plug 176 of the pigtail 174 threads such that the pigtail 174 is secured within the primary tube 101. The preferred fastening structure 111 comprises a plurality of radial holes 121 and a primary fastening hardware 122.

Each of the plurality of radial holes 121 is a hole selected from the group consisting of a radial hole and an offset radial hole. The radial hole and the offset radial hole are discussed in greater detail elsewhere in this disclosure. Each of the plurality of radial holes 121 is formed in a structure selected from the group consisting of the primary tube 101 and the shaft 172 of the tongue 171. The plurality of radial holes 121 comprises a first radial hole 131, a second radial hole 132, a first offset radial hole 133, and a second offset radial hole 134.

The first radial hole 131 is a radial hole that is formed through the lateral face of the prism structure of the primary tube 101. The second radial hole 132 is a radial hole that is formed through the lateral face of the prism structure of the primary tube 101. The first offset radial hole 133 is a radial hole that is formed through the lateral face of the prism structure of the shaft 172 of the tongue 171. The second offset radial hole 134 is a radial hole that is formed through the lateral face of the prism structure of the shaft 172 of the tongue 171.

The span of the perpendicular distance between the center axis of the first radial hole 131 and the center axis of the second radial hole 132 is identical to the span of the distance between the center axis of the first offset radial hole 133 and the center axis of the second offset radial hole 134 are identical.

The first radial hole 131, the second radial hole 132, the first offset radial hole 133 and the second offset radial hole are positioned relative to each other such that the center axis of the primary tube 101 is perpendicular to the center axis of the shaft 172 of the tongue 171 when: a) the center axis of the first radial hole 131 is aligned with the center axis of the first offset radial hole 133; and, b) the center axis of the second radial hole 132 is aligned with the center axis of the second offset radial hole 134.

The primary fastening hardware 122 comprises hardware selected from the group consisting of bolts and nuts. The primary fastening hardware 122 insert through the plurality of radial holes 121 to attach the primary tube 101 to the shaft 172 of the tongue 171. The primary fastening hardware 122 comprises a first bolt 141, a second bolt 142, a first nut 143, and a second nut 144.

The first bolt 141 is a commercially available hardware item. The outer diameter of the first bolt 141 is lesser than the inner diameter of the first radial hole 131 such that the first bolt 141 inserts through the first radial hole 131. The outer diameter of the first bolt 141 is lesser than the inner diameter of the first offset radial hole 133 such that the first bolt 141 inserts through the first offset radial hole 133. The span of the length of the center axis of the first bolt 141 is greater than the sum of the center axes of the first radial hole 131 and the first offset radial hole 133.

The second bolt 142 is a commercially available hardware item. The outer diameter of the second bolt 142 is lesser than the inner diameter of the second radial hole 132 such that the second bolt 142 inserts through the second radial hole 132. The outer diameter of the second bolt 142 is lesser than the inner diameter of the second offset radial hole 134 such that the second bolt 142 inserts through the second offset radial hole 134. The span of the length of the center axis of the second bolt 142 is greater than the sum of the center axes of the second radial hole 132 and the second offset radial hole 134.

The first bolt 141 and the second bolt 142 are both well-known and documented hardware items. The bolt is defined in greater detail elsewhere in this disclosure.

The first nut 143 is a well-known and commercially available hardware item. The first nut 143 is sized to screw on the first bolt 141. The second nut 144 is a well-known and commercially available hardware item. The second nut 144 is sized to screw on the second bolt 142.

The primary tube 101 attaches to the shaft 172 of the tongue 171 by fully inserting the first bolt 141 through the extended structure formed by the alignment of the first radial hole 131 and the first offset radial hole 133 and then securing the first bolt 141 to the shaft 172 using the first nut 143.

The attachment of the primary tube 101 to the shaft 172 of the tongue 171 is subsequently completed by fully inserting the second bolt 142 through the extended structure formed by the alignment of the second radial hole 132 and the second offset radial hole 134 and then securing the second bolt 142 to the shaft 172 using the second nut 144.

When the preferred fastening structure 111 is used, the plug 176 of the pigtail 174 threads around the first bolt 141 and the second bolt 142 such that the pigtail 174 is secured within the primary tube 101.

The secondary fastening structure 112 is an alternate structure that fastens the primary tube 101 to the shaft 172 of the tongue 171. The secondary fastening structure 112 comprises a pipe strap 151 and incidental hardware 152. The pipe strap 151 is a commercially available hardware item commonly marketed as a pipe strap. The pipe strap 151 is a device that attaches the primary tube 101 to the lateral face of the shaft 172 of the tongue 171. The incidental hardware 152 comprises commercially available hardware products intended to attach the pipe strap 151 to the lateral face of the shaft 172 of the tongue 171. The plug 176 of the pigtail 174 inserts into the inferior end 161 of the primary tube 101.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Aperture: As used in this disclosure, an aperture is a prism-shaped negative space that is formed completely through a structure or the surface of a structure.

Bolt: As used in this disclosure, a bolt is a cylindrical shaft that is formed with an exterior screw thread. A bolt is defined with an outer diameter.

Cable: As used in this disclosure, a cable is a collection of insulated wires covered by a protective casing that is used for transmitting electricity or telecommunication signals.

Cap: As used in this disclosure, a cap is a protective cover that encloses a space.

Capped Tube: As used in this disclosure, a capped tube is a tube with one closed end and one open end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Hardware: As used in this disclosure, refers to one or more incidental objects: 1) that are readily and commercially available; and, 2) that are associated with the installation, operation or maintenance of a primary object.

Hitch: As used in this disclosure, a hitch is a fastening apparatus that attaches an unpowered vehicle, such as a trailer, to a motorized vehicle such that the motorized vehicle can tow the unpowered vehicle.

Inner Dimension: As used in this disclosure, the term inner dimension describes the span from a first inside or interior surface of a container to a second inside or interior surface of a container. The term is used in much the same way that a plumber would refer to the inner diameter of a pipe.

Incidental: As used in this disclosure, incidental refers to a second object that is associated with a first object but that: 1) does not significantly affect the characteristics of the first object; and, 2) the function of which can be readily replaced by or substituted with a third object.

Inferior: As used in this disclosure, the term inferior refers to an edge or surface of an object that would commonly be referred to as the bottom of the object.

Nut: As used in this disclosure, a nut is a first object that is formed with a cylindrical negative space that further comprises an interior screw thread such that a second object with a matching exterior screw thread can screw into the first object forming a threaded connection. A nut is further defined with an inner diameter.

Offset Radial hole: As used in this disclosure, an offset radial hole comprises a hole that is formed through a solid cylinder such that: 1) the formed hole is cylindrical; and, 2) the center axis of the formed hole is perpendicular to the center axis of the solid cylinder; but, 3) the center axis of the formed hole does not intersect with the center axis of the solid cylinder. When the term offset radial hole is applied to a pipe, or other hollow cylindrical object, the term applies to two holes that are formed in the surface of the pipe in a manner that is consistent with the solid cylinder definition. When the term offset radial hole is applied to a prism formed from an N-gon when N is an even number, the assumption should be made that the center axis is formed by a line that connects the center of the first corresponding face of the prism to the center of the second corresponding face of the prism.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pigtail: As used in this disclosure, a pigtail refers to an electrical wiring apparatus that attaches the electrical system of a trailer to the electrical system of a tractor.

Plug: As used in this disclosure, a plug is an electrical termination that electrically connects a first electrical circuit to a second electrical circuit or a source of electricity. As used in this disclosure, a plug will have two or three metal pins.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Radial hole: As used in this disclosure, a radial hole comprises a hole that is formed through a solid cylinder such that: 1) the formed hole is cylindrical; 2) the center axis of the formed hole is perpendicular to the center axis of the solid cylinder; and, 3) the center axis of the formed hole intersects the center axis of the solid cylinder. When the term radial hole is applied to a pipe or other hollow cylindrical object, the term applies to two holes that are formed in the surface of the pipe in a manner that is consistent with the solid cylinder definition. When the term radial hole is applied to a prism formed from an N-gon when N is an even number, the assumption should be made that the center axis is formed by a line that connects the center of the first corresponding face of the prism to the center of the second corresponding face of the prism.

Screw: As used in this disclosure, to screw is a verb meaning: 1) to fasten or unfasten (unscrew) a threaded connection; or 2) to attach a helical structure to a solid structure.

Superior: As used in this disclosure, the term superior refers to an edge or surface of an object that would commonly be referred to as the top of the object.

Thread: As used in this disclosure, to thread is a verb that refers to inserting a cord or a webbing through one or more holes.

Threaded Connection: As used in this disclosure, a threaded connection is a type of fastener that is used to join a first tube-shaped and a second tube-shaped object together. The first tube-shaped object is fitted with a first fitting selected from an interior screw thread or an exterior screw thread. The second tube-shaped object is fitted with the remaining screw thread. The tube-shaped object fitted with the exterior screw thread is placed into the remaining tube-shaped object such that: 1) the interior screw thread and the exterior screw thread interconnect; and, 2) when the tube-shaped object fitted with the exterior screw thread is rotated the rotational motion is converted into linear motion that moves the tube-shaped object fitted with the exterior screw thread either into or out of the remaining tube-shaped object. The direction of linear motion is determined by the direction of rotation.

Tongue: As used in this disclosure, a tongue is a shaft structure that attaches to a trailer such that the shaft structure: a) projects away from the trailer in a direction parallel to the primary sense of direction of the trailer. The apparatus required to hitch the trailer to a tractor mounts on the tongue.

Tractor: As used in this disclosure, a tractor refers to a vehicle that is used to pull a trailer.

Trailer: As used in this disclosure, a trailer is an unpowered wheeled vehicle that is towed by a powered vehicle known as a tractor.

Tube: As used in this disclosure, the term tube is used to describe a rigid hollow prism with two open ends. While tubes that are suitable for use in this disclosure are often used to transport or conveys fluids or gases, the purpose of the tubes in this disclosure are structural. In this disclosure, the terms inner dimension and the outer dimension of a tube are used as they would be used by those skilled in the plumbing arts.

Weather: As used in this disclosure, the term weather refers to a collection of measurable parameters of the atmosphere including, but not limited to, temperature, humidity, precipitation, air movement caused by wind and energy and illumination from the sun. A structure that isolates an individual or object from the more uncomfortable or destructive aspects of the weather is said to provide protection against the weather. The term elements is often used to refer to weather.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A protective cover for an electrical circuit comprising:
a primary tube, a capped tube and a fastening device;
wherein the capped tube encloses the primary tube;
wherein the protective cover for an electrical circuit is for use with a tongue of a trailer;
wherein the fastening device attaches the primary tube to the tongue;
wherein the tongue further comprises a shaft, a hitch, and a pigtail;
wherein the shaft is a prism-shaped extension structure;
wherein the pigtail further comprises a cable and a plug;
wherein the protective cover for an electrical circuit is a container that stores the pigtail;
wherein the primary tube stores the plug end of the pigtail;
wherein the primary tube forms the primary storage space of the protective cover for an electrical circuit;
wherein the primary tube is further defined with an inferior end and a superior end;
wherein the primary tube attaches to the shaft of the tongue;
wherein the capped tube is formed as a capped tube;
wherein the inner diameter of the capped tube is greater than the outer diameter of the primary tube such that the capped tube fits over the primary tube;
wherein the open end of the capped tube mounts over the superior end of the primary tube such that the pigtail is protected from the weather while the pigtail is contained in the primary tube;
wherein the capped tube is further defined with an open end and a closed end;
wherein the fastening device is a mechanical apparatus that attaches the primary tube to the shaft of the tongue;
wherein the fastening device attaches the primary tube to the shaft such that the center axis of the primary tube is perpendicular to the center axis of the shaft;
wherein the fastening device is selected from the group consisting of a preferred fastening structure and a secondary fastening structure;
wherein the preferred fastening structure provides a structure through which the plug of the pigtail threads such that the pigtail is secured within the primary tube;
wherein the secondary fastening structure is an alternate structure that fastens the primary tube to the shaft of the tongue.

2. The protective cover for an electrical circuit according to claim 1
wherein the preferred fastening structure comprises a plurality of radial holes and a primary fastening hardware;
wherein the primary fastening hardware inserts through the plurality of radial holes.

3. The protective cover for an electrical circuit according to claim 2
wherein each of the plurality of radial holes is a hole selected from the group consisting of a radial hole and an offset radial hole;
wherein each of the plurality of radial holes is formed in a structure selected from the group consisting of the primary tube and the shaft of the tongue.

4. The protective cover for an electrical circuit according to claim 3 wherein the primary fastening hardware comprises hardware selected from the group consisting of bolts and nuts;

wherein the primary fastening hardware insert through the plurality of radial holes to attach the primary tube to the shaft of the tongue.

5. The protective cover for an electrical circuit according to claim 4
wherein the plurality of radial holes comprises a first radial hole, a second radial hole, a first offset radial hole, and a second offset radial hole;
wherein the first radial hole is a radial hole that is formed through the lateral face of the prism structure of the primary tube;
wherein the second radial hole is a radial hole that is formed through the lateral face of the prism structure of the primary tube;
wherein the first offset radial hole is a radial hole that is formed through the lateral face of the prism structure of the shaft of the tongue;
wherein the second offset radial hole is a radial hole that is formed through the lateral face of the prism structure of the shaft of the tongue.

6. The protective cover for an electrical circuit according to claim 5 wherein the span of the perpendicular distance between the center axis of the first radial hole and the center axis of the second radial hole is identical to the span of the distance between the center axis of the first offset radial hole and the center axis of the second offset radial hole are identical.

7. The protective cover for an electrical circuit according to claim 6 wherein the first radial hole, the second radial hole, the first offset radial hole and the second offset radial hole are positioned relative to each other such that the center axis of the primary tube is perpendicular to the center axis of the shaft of the tongue when: a) the center axis of the first radial hole is aligned with the center axis of the first offset radial hole; and, b) the center axis of the second radial hole is aligned with the center axis of the second offset radial hole.

8. The protective cover for an electrical circuit according to claim 7
wherein the primary fastening hardware comprises a first bolt, a second bolt, a first nut, and a second nut;
wherein the outer diameter of the first bolt is lesser than the inner diameter of the first radial hole such that the first bolt inserts through the first radial hole;
wherein the outer diameter of the first bolt is lesser than the inner diameter of the first offset radial hole such that the first bolt inserts through the first offset radial hole;
wherein the outer diameter of the second bolt is lesser than the inner diameter of the second radial hole such that the second bolt inserts through the second radial hole;
wherein the outer diameter of the second bolt is lesser than the inner diameter of the second offset radial hole such that the second bolt inserts through the second offset radial hole.

9. The protective cover for an electrical circuit according to claim 8
wherein the span of the length of the center axis of the first bolt is greater than the sum of the center axes of the first radial hole and the first offset radial hole;
wherein the span of the length of the center axis of the second bolt is greater than the sum of the center axes of the second radial hole and the second offset radial hole.

10. The protective cover for an electrical circuit according to claim 9
wherein the first nut is sized to screw on the first bolt;
wherein the second nut is sized to screw on the second bolt.

11. The protective cover for an electrical circuit according to claim 10
wherein the primary tube attaches to the shaft of the tongue by fully inserting the first bolt through the extended structure formed by the alignment of the first radial hole and the first offset radial hole and then securing the first bolt to the shaft using the first nut;
wherein the primary tube attaches to the shaft of the tongue by fully inserting the second bolt through the extended structure formed by the alignment of the second radial hole and the second offset radial hole and then securing the second bolt to the shaft using the second nut;
wherein the plug of the pigtail threads around the first bolt and the second bolt such that the pigtail is secured within the primary tube.

12. The protective cover for an electrical circuit according to claim 11
wherein the secondary fastening structure comprises a pipe strap and incidental hardware;
wherein the incidental hardware attaches the pipe strap to the shaft of the tongue;
wherein the plug of the pigtail inserts into the inferior end of the primary tube.

* * * * *